Sept. 17, 1963     H. W. FERGUSON     3,104,069
ROTARY SCREEN AND GRINDER
Filed July 10, 1962
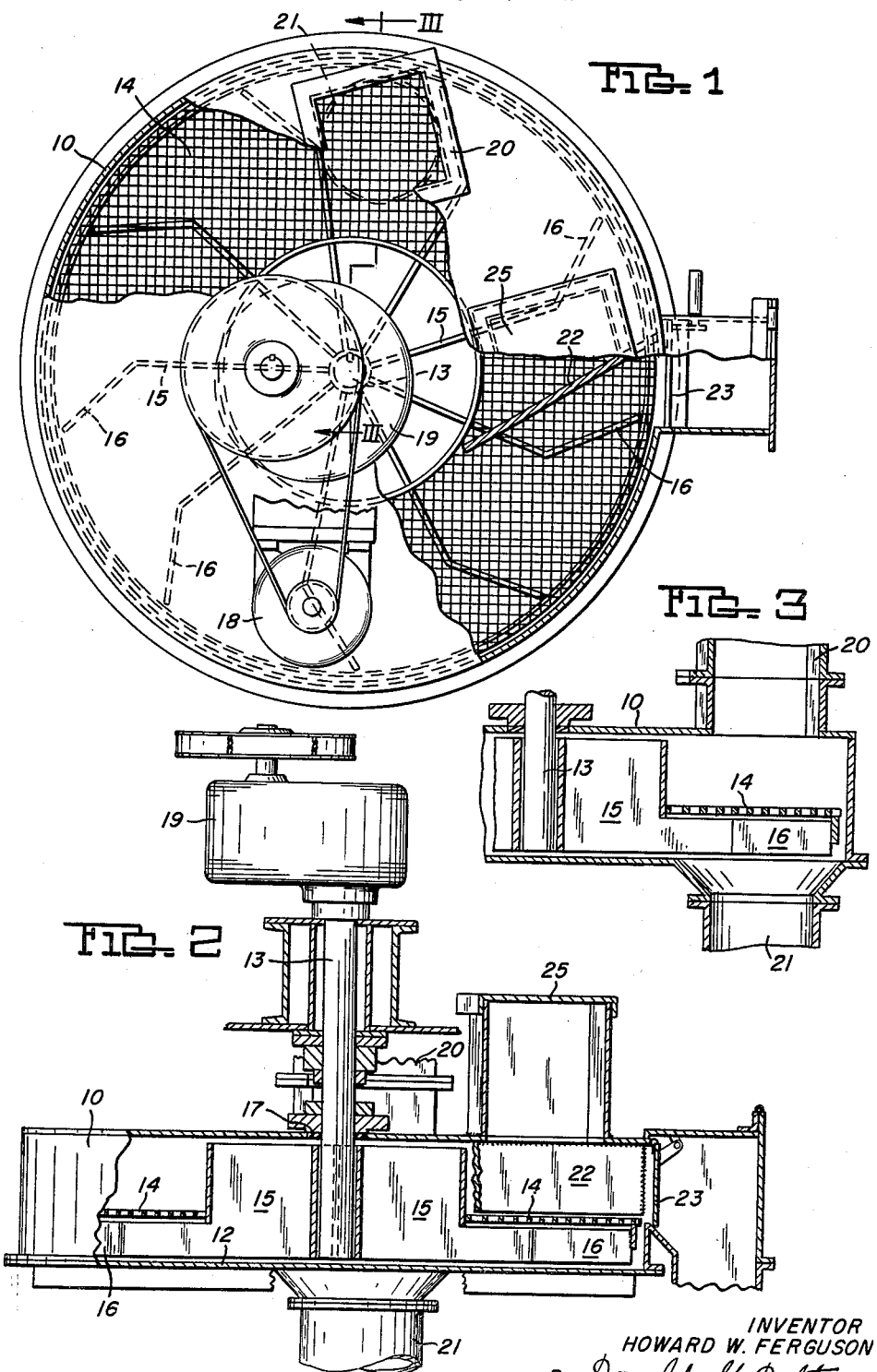
INVENTOR
HOWARD W. FERGUSON
By Donald G. Dalton
Attorney 3,104,069
ROTARY SCREEN AND GRINDER
Howard W. Ferguson, Flushing, N.Y., assignor to United States Steel Corporation, a corporation of New Jersey
Filed July 10, 1962, Ser. No. 208,743
2 Claims. (Cl. 241—83)

This invention relates to an improved rotary screen and grinder.

An object of the invention is to provide a rotary screen and grinder which sifts fine material and at the same time grinds accompanying lumps by attrition.

A further object is to provide a rotary screen and grinder which handles large volumes of material, such as cement, and yet is of compact size, especially in the vertical direction.

In accomplishing these and other objects of the invention, I have provided improved details of structure, a preferred form of which is shown in the accompanying drawing, in which:

FIGURE 1 is a top plan view of my screen and grinder with parts broken away;

FIGURE 2 is a side elevational view with parts broken away; and

FIGURE 3 is a vertical section on line III—III of FIGURE 1.

My rotary screen and grinder includes an upright stationary cylindrical housing 10, a plate 12 fixed to the underside of the housing and forming a bottom wall, a vertical drive shaft 13 extending through the top wall of the housing, and a rotatable annular screen 14 carried by the drive shaft. The screen has a flat horizontal section spaced between the top and bottom walls of the housing, and a cylindrical vertical section extending from the inner circumference of its horizontal section. A plurality of radially extending scrapers 15 are fixed to both the drive shaft and screen and attach the two together. The scrapers extend under the horizontal section of the screen and preferably their end portions are bent in the direction of rotation, as indicated at 16. The drive shaft also carries a dust seal 17 where it passes through the top wall of the housing. The drive shaft can be driven by any suitable means, such as a motor 18 and speed reducer 19 illustrated. A feed spout 20 extends from the top wall of housing 10 and a discharge pipe 21 from the bottom wall, preferably directly under the feed spout. A stationary baffle 22 is fixed to the inside of the housing and extends across the screen 14. The cylindrical side wall of the housing has a gate 23 located adjacent baffle 22. The top wall of the housing also has an access door 25.

In operation, I feed lumpy material, such as cement, to the upper portion of the housing 10 via the feed spout 20. Fine material in the feed sifts directly through the screen 14 to the bottom plate 12. The scrapers 15 push this material along the plate to the discharge pipe 21. The bottom edges of the scrapers lie adjacent the upper surface of the plate, but there is sufficient clearance to permit free movement. Rotation of the screen conveys lumps to a position against the stationary baffle 22. Continued movement of the screen abrades the lumps and thus effects a grinding action by attrition. Additional fine material from the lumps sifts through the screen and joins the fine material which sifted through directly. Lumps which do not break up in this manner I remove through the discharge gate 23.

From the foregoing description, it is seen that my invention affords a rotary screen and grinder of simple and compact construction, yet it readily breaks up lumpy material. In an installation in a cement plant, a device constructed as descrbied handles 4000 cubic feet an hour, yet is only 18 inches high. The openings in the screen can be relatively coarse, for example about 1 inch square.

While I have shown and described only a single embodiment of my invention, it is apparent that modifications may arise. Therefore, I do not wish to be limited to the disclosure set forth but only by the scope of the appended claims.

I claim:

1. A rotary screen and grinder comprising a stationary cylindrical housing having side, top and bottom walls, an annular screen within said housing spaced between said top and bottom walls, a rotatable drive shaft extending vertically through said top wall, a plurality of radially extending scrapers fixed to said drive shaft and said screen and extending under said screen, means for feeding lumpy material into said housing above said screen, means in said bottom wall for discharging fine material which sifts through said screen, said scrapers having bottom edges which lie adjacent the upper surface of said bottom wall for pushing material along the bottom wall to said discharge means, and a stationary baffle fixed to the inside of said housing and extending across said screen, said baffle being adapted to hold lumps on the screen while rotation of the screen grinds the lumps by attrition.

2. A rotary screen and grinder comprising a stationary cylindrical housing having side, top and bottom walls, an annular screen within said housing spaced between said top and bottom walls, a rotatable drive shaft extending vertically through said top wall, a plurality of radially extending scrapers fixed to said drive shaft and said screen and extending under said screen, a feed spout connected to said top wall for feeding lumpy material to said housing above said screen, means in said bottom wall for discharging fine material which sifts through said screen, said scrapers having bottom edges which lie adjacent the upper surface of said bottom wall for pushing material along the bottom wall to said discharge means, a stationary baffle fixed to the inside of said housing and extending across said screen, said baffle being adapted to hold lumps on the screen while rotation of the screen grinds the lumps by attrition, and a discharge gate in said side wall for removing lumps which fail to grind.

References Cited in the file of this patent
UNITED STATES PATENTS

| | | |
|---|---|---|
| 886,966 | Findley | May 5, 1908 |
| 2,138,716 | Truitt | Nov. 29, 1938 |

FOREIGN PATENTS

| | | |
|---|---|---|
| 14,667 | Great Britain | Oct. 12, 1888 |